(12) United States Patent
Pihur et al.

(10) Patent No.: US 9,245,228 B1
(45) Date of Patent: Jan. 26, 2016

(54) STATISTICAL MODEL FOR ESTIMATING UNIQUE USERS FROM UNAUTHENTICATED COOKIES

(71) Applicant: Google Inc., Mountain View, CA (US)

(72) Inventors: Vasyl Pihur, San Francisco, CA (US); Armand Dijamco, San Francisco, CA (US); David Diez, San Francisco, CA (US); William Dirks, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 322 days.

(21) Appl. No.: 13/974,838

(22) Filed: Aug. 23, 2013

(51) Int. Cl.
*G06N 5/02* (2006.01)
*G06N 7/00* (2006.01)

(52) U.S. Cl.
CPC .............. *G06N 5/022* (2013.01); *G06N 7/005* (2013.01)

(58) Field of Classification Search
CPC ............................ G06N 5/022; G06N 7/005
USPC ............................................. 706/52; 709/224
See application file for complete search history.

(56) References Cited

U.S. PATENT DOCUMENTS

| 7,761,558 | B1 | 7/2010 | Jindal et al. |
| 8,126,816 | B2 | 2/2012 | Mu et al. |
| 8,386,599 | B2 | 2/2013 | Fomitchev |
| 8,396,822 | B2 | 3/2013 | Dasgupta et al. |
| 2012/0324101 | A1 | 12/2012 | Pecjack et al. |

OTHER PUBLICATIONS

Metwally et al ("Estimating the Number of Users behind IP Addresses for Combating Abusive Traffic" 2011).*

* cited by examiner

*Primary Examiner* — Lut Wong
(74) *Attorney, Agent, or Firm* — Lowenstein Sandler LLP

(57) ABSTRACT

This disclosure generally relates to systems and methods that facilitate employing a statistical model over a specified time frame divided into a plurality of time intervals for estimating a quantity of unique users from a set of unauthenticated unique identifiers, such as cookies, associated with accesses to one or more servers.

26 Claims, 11 Drawing Sheets

STATISTICAL MODEL FOR ESTIMATING UNIQUE USERS FROM UNAUTHENTICATED COOKIES

TECHNICAL FIELD

This disclosure generally relates to systems and methods that facilitate employing a statistical model over a specified time frame divided into a plurality of time intervals for estimating a quantity of unique users from a set of unauthenticated unique identifiers, such as cookies, associated with accesses to one or more servers.

BACKGROUND OF THE INVENTION

When users log into a site (e.g. employing an authenticated unique identifier such as a username), it is easy to track respective users from multiple devices, browsers, applications, etc., in order to obtain count of unique users visiting the site. On the other hand, if a user is not logged-in to a site, an unauthenticated unique identifier, such as a cookie (e.g., small piece of data sent from a website and stored in a user's web browser), can be used as a surrogate to keep track of and count users. However, simply counting number of distinct cookies can greatly over or under count actual number of unique users. For example, a cookie can expire or a user can choose to delete the cookie, resulting in another cookie being generated. In another example, a user can block cookies completely such that no cookie will be generated for the user. In a further example, different devices, browsers, and/or applications can have different cookies resulting in multiple cookies being generated for the same user. Consequently, count of unique users associated with unauthenticated unique identifiers can be over or under counted.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a plurality of unauthenticated unique identification records associated with transactions between at least one client device and at least one server device during a specified time frame are accessed, wherein respective unauthenticated unique identification records are associated with respective unauthenticated unique identifiers of a plurality of unauthenticated unique identifiers, a subset of the plurality of unauthenticated unique identification records that meet a selection criteria are selected, the time frame is segmented into a plurality of disjoint time intervals, possible combinations of bit patterns representing the respective unauthenticated unique identifiers are determined, wherein a length of the bit patterns equals a quantity of the time intervals and each bit of a bit pattern indicates whether a corresponding unauthenticated unique identifier has an associated unauthenticated unique identification record that meets the selection criteria for a time interval associated with the bit, a total quantity of possible churn patterns for the bit patterns is determined, a total quantity of expected unauthenticated unique identifiers for all combinations of the bit patterns and the churn patterns is determined, and a ratio of unauthenticated unique identifiers to unique users is determined based upon the total quantity of expected unauthenticated unique identifiers and the total quantity of the churn patterns.

In accordance with a non-limiting implementation, a data processing component is configured to: access a plurality of unauthenticated unique identification records associated with transactions between at least one client device and at least one server device during a specified time frame, wherein respective unauthenticated unique identification records are associated with respective unauthenticated unique identifiers of a plurality of unauthenticated unique identifiers, select a subset of the plurality of unauthenticated unique identification records that meet a selection criteria, segment the time frame into a plurality of disjoint time intervals, and determine possible combinations of bit patterns representing the respective unauthenticated unique identifiers, wherein a length of the bit patterns equals a quantity of the time intervals and each bit of a bit pattern indicates whether a corresponding unauthenticated unique identifier has an associated unauthenticated unique identification record that meets the selection criteria for a time interval associated with the bit, and a modeling component configured to: determine a total quantity of possible churn patterns for the bit patterns, determine a total quantity of expected unauthenticated unique identifiers for all combinations of the bit patterns and the churn patterns, and determine a ratio of unauthenticated unique identifiers to unique users based upon the total quantity of expected unauthenticated unique identifiers and the total quantity of the churn patterns.

These and other implementations and embodiments are described in more detail below.

DETAILED DESCRIPTION

Overview

Figure 1:
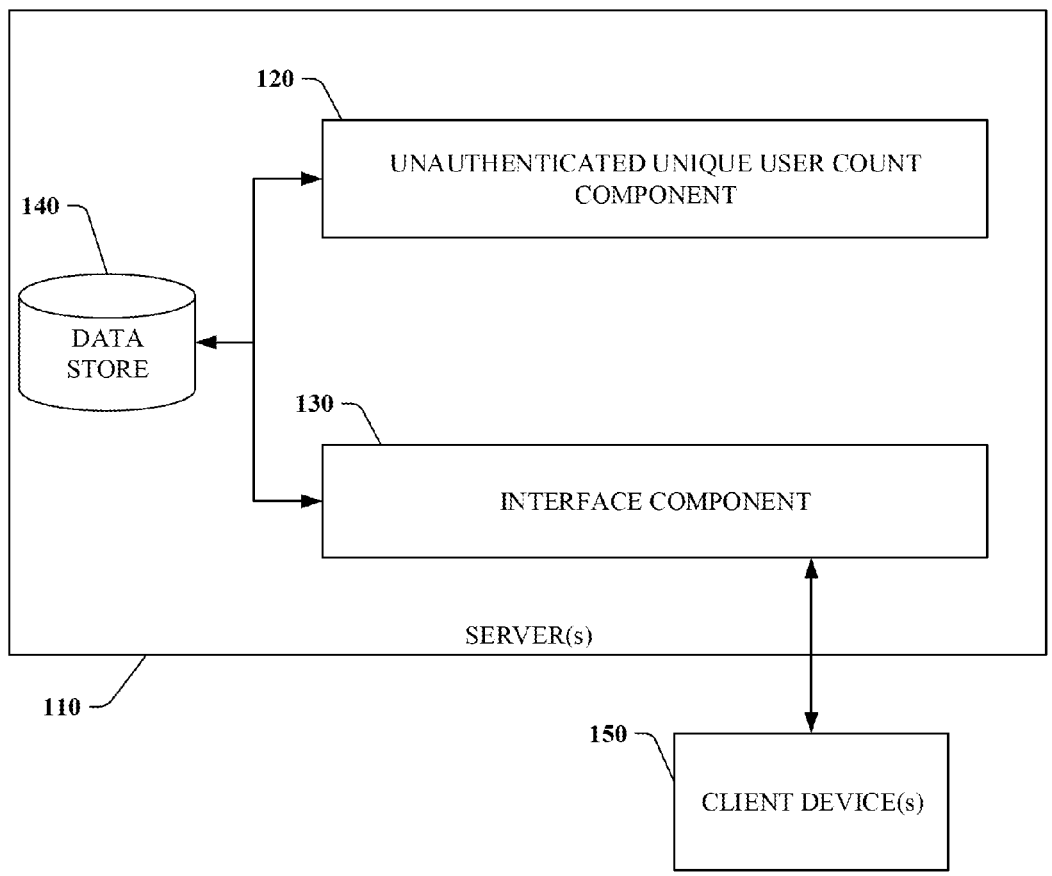
FIG. 1 illustrates a block diagram of an exemplary non-limiting system for estimating quantity of unique users (or visitors, for example, when a client device is shared by multiple users, a visitor can represent a group of users that share an unauthenticated unique identifier) from a set of unauthenticated unique identifiers in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which systems and methods described here collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (e.g., such as to a city, ZIP code, or state level), so that a particular location of a user cannot be determined. The user can add, delete, or modify information about the user. Thus, the user can control how information is collected about he or she and used by a server.

In accordance with various disclosed aspects, a mechanism is provided for statistically estimating a ratio of unauthenticated unique identifiers to unique users. For example, a website can be accessed from a plurality of devices and browsers without requiring a user to login. In order to track users accessing the website, cookies can be generated for the devices and/or browsers. However, a single user can access the website using multiple device and/or browsers, or a single user can generate a new cookie from a device or browser. As such, multiple cookies can be associated with accesses from a single user. An unauthenticated unique user count component can employ a statistical model over a specified time frame divided into a plurality of time intervals for estimating a quantity of unique users from a set of unauthenticated unique identifiers based upon estimated parameters of a distribution function.

An authenticated unique identifier (e.g. username/password, biometric data, certificate, security token, key, or any other suitable identifier) is unique information that allows for identifying a particular user that has been authenticated by a site being accessed by the user. An unauthenticated unique identifier (e.g., cookie identifier, application identifier, device identifier, session identifier, or any other suitable identifier) is unique information issued for a device, browser, or application that acts as a surrogate for a particular user (or visitor) that has not been authenticated by a site being accessed by the user from the device, browser, or application.

Referring now to the drawings, FIG. 1 depicts a system 100 for estimating a quantity of unique users (or visitors, for example, when a client device is shared by multiple users, a visitor can represent a group of users that share an unauthenticated unique identifier) from a set of unauthenticated unique identifiers. System 100 includes server(s) 110 configured to be accessed by client device(s) 150. Server 110 includes unauthenticated unique user count component 120 that estimates the quantity of unique users from the set of unauthenticated unique identifiers associated with transactions between server(s) 110 and client device(s) 150. Server 110 also includes interface component 130 that interacts with client device(s) 150 to facilitate exchange of data. Additionally, server 110 includes a data store 140 that can store data generated or received by server 110, unauthenticated unique user count component 120, and interface component 130. Data store 140 can be stored on any suitable type of storage device, non-limiting examples of which are illustrated with reference to FIGS. 6 and 7.

While only one client device 150 is shown, it is to be understood that client device 150 can concurrently interact with any suitable number of servers 110. In addition, server 110 can interact with any suitable number of client devices 150 concurrently. Moreover, while unauthenticated unique user count component 120 is depicted as part of server 110, unauthenticated unique user count component 120 can be part of client device 150 or on a separate device that has access to information related to unauthenticated unique identifiers and associated transactions between client device(s) 150 and server(s) 110. Additionally, an unauthenticated unique user count component 120 on server 110 can estimate unique users associated with transactions between client device(s) 150 and the server 110 and additional server(s) 150. Furthermore, server 110 and client device 150 can respectively receive input from users to control recording, interaction with, and presentation of content and associated information, for example, using input devices, non-limiting examples of which can be found with reference to FIG. 7.

Figure 7:
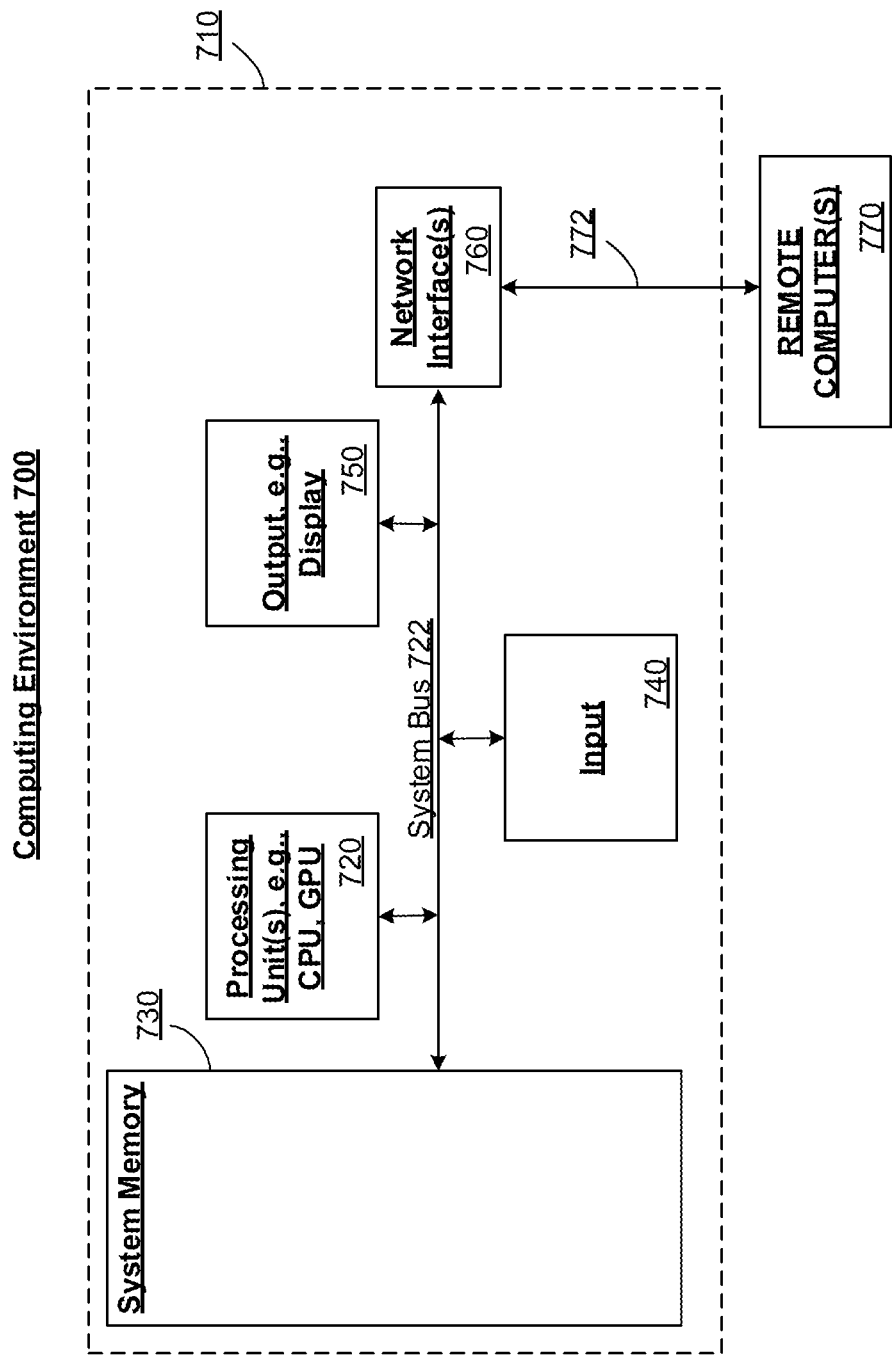
FIG. 7 illustrates a block diagram of an exemplary non-limiting computing system or operating environment in which various embodiments can be implemented.

Server 110 and client device 150, respectively include at least one memory that stores computer executable components and at least one processor that executes the computer executable components stored in the memory, a non-limiting example of which can be found with reference to FIG. 7. Server 110 can communicate via a wired and/or wireless network with client device 150.

Server 110 and client device 150 can be any suitable type of device for recording, interacting with, receiving, accessing, or supplying data locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording content that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, motion sensor, infrared sensor, or any other suitable device capable of recording content. Moreover, server 110 and client device 150 can include a user interface (e.g., a web browser or application), that can receive and present displays and data generated locally or remotely.

Figure 2:
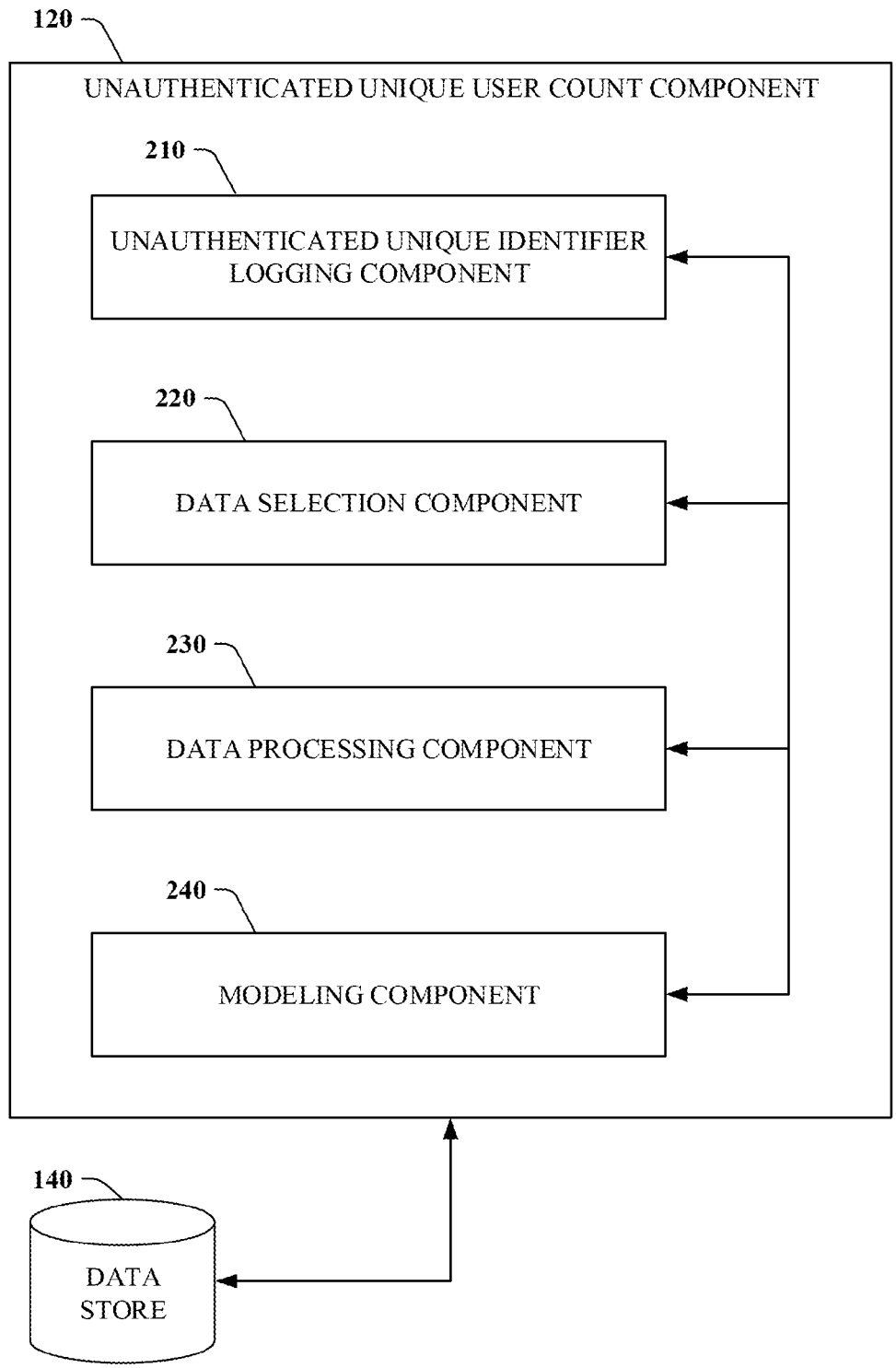
FIG. 2 illustrates a block diagram of an exemplary non-limiting unauthenticated unique user count component that estimates quantity of unique users from set of unauthenticated unique identifiers in accordance with an implementation of this disclosure.

FIG. 2 illustrates unauthenticated unique user count component 120 that estimates a quantity of unique users from set of unauthenticated unique identifiers associated with accesses to server(s) 110 from client device(s) 150. Unauthenticated unique user count component 120 includes an unauthenticated unique identifier logging component 210 that stores unauthenticated unique identification records associated with transactions between client device(s) 150 and server(s) 150. For example, when a user associated with client device 150 accesses server 110 without being authenticated by server 110, an unauthenticated unique identifier can be generated for (e.g. by server 110, client device 150, or application) or employed by (e.g. if a suitable unauthenticated unique identifier already exists) client device 150 or an application being used by the user on client device 150. It is to be appreciated that the unauthenticated unique identifier may also capture accesses associated with authenticated users, for example on shared devices and browsers, or when the user access a site while logged in and out using the same device or browser. The unauthenticated unique identifier can be associated with transactions between the client device 150 or application and the server 110, and stored along with other transactions having unauthenticated unique identifiers associated with browsers, applications, or client device(s) 150. In a non-limiting example, an unauthenticated unique identification record can include, for example: unauthenticated unique identifier; identification of site accessed (e.g. URL, URI, domain name, website address, server address, IP address, file path, or any other suitable identifier of a site associated with the transaction); date and time of access to site; activity associated with transaction (e.g., video playback, downloading song, search, upload pictures, or any other suitable activity); location of client device 150 (e.g., geographic location, IP address, or any other suitable location identifier); or any other suitable information associated with the transaction. It is to be appreciated that any suitable information can be stored in an unauthenticated unique identification record associated with an unauthenticated unique identifier and associated transactions between server(s) 110 and client device(s) 150. Furthermore, there can be multiple unauthenticated unique identification records associated with an unauthenticated unique identifier.

Additionally, unauthenticated unique identifier logging component 210 can filter out transactions between server(s) 150 and client device(s) 150, such as those associated with spam, and not store those transaction. It is to be appreciated that any suitable filtering criteria can employed for filtering out transactions. The filtering criteria can be predefined, dynamically determined, and/or user specified.

Unauthenticated unique user count component 120 also includes data selection component 220 that selects a set of unauthenticated unique identification records associated with transactions with a specified time frame T and meeting a selection criteria for estimation of unique users represented by the selected set of unauthenticated unique identification records. It is to be appreciated that the specified time frame T and selection criteria can be predefined, dynamically determined, and/or user specified. For example, there can be predefined time frames of a day, a week, a month, or any other suitable time frame. In another example, a user can be prompted to specify a time frame. In a further example, data selection component 220 can dynamically determine, such as from analyzing historical data regarding user specified time frames, a preferred time frame. For example, at the end of the month a preferred time frame can be a month, or in the middle of the month a preferred time frame can be a week, or in the beginning of the month a preferred time frame can be a day. It is to be appreciated that any suitable time frame can be specified.

The selection criteria can include, for example, all unauthenticated unique identification records with no other criteria, to consider all unauthenticated unique identification records for the specified time frame T. In another example, if an estimate of the number of unique users from a particular location (e.g. continent, country, state, city, or any other suitable location) were desired, then the selection criteria can specify unauthenticated unique identification records associated with transactions made from that particular location. In a further example, if an estimate of the number of unique users associated with a particular activity is desired (e.g., video playback, downloading song, search, upload pictures, or any other suitable activity), then the selection criteria can specify unauthenticated unique identification records associated with the particular activity. In an additional example, if an estimate of the number of unique users associated with a particular site is desired (e.g., webpage, video channel, file path, or any other suitable identifier of a site), then the selection criteria can specify unauthenticated unique identification records associated with the particular site. It is to be appreciated that any suitable selection criteria based upon data in an unauthenticated unique identification record can be specified.

Unauthenticated unique user count component 120 also includes data processing component 230 that processes the selected set of unauthenticated unique identification records having a total number of unauthenticated unique identifiers U to generate bit patterns for employment in modeling. Data processing component 230 divides the specified time frame T into N intervals $t_1, t_2, \ldots t_N$, where N is an integer greater than 2. The respective intervals $t_1, t_2, \ldots t_N$ can be of the same length or of different lengths. For each unauthenticated unique identifier in the set of unauthenticated unique identification records, data processing component 230 constructs a bit pattern B of length N (e.g. $b_1 b_2 \ldots b_N$), where each bit $b_m$ represents an interval $t_m$, a value of 1 for bit $b_m$ indicates that the unauthenticated unique identifier is associated with an unauthenticated unique identification record meeting the selection criteria during the interval $t_m$, and a value of 0 for bit $b_m$ that indicates the unauthenticated unique identifier is not associated with an unauthenticated unique identification record meeting the selection criteria during interval $t_m$, where m is an integer from 1 to N. For example, a bit pattern $B=b_1 b_2 b_3 b_4 b_5$ for five intervals having a value of 01100 indicates an unauthenticated unique identifier having associated unauthenticated unique identification records meeting the selection criteria during intervals 2 and 3 but not during intervals 1, 4, and 5. Optionally, for each possible pattern, the number of unauthenticated unique identifiers associated with that pattern can be counted and summarized in a table to improve data processing efficiency. For example, where N=5, then there are (up to) 31 distinct bit patterns $B_1, B_2, \ldots B_m$ that can occur, where M is the number of possible combinations of bit patterns of length N (in this example M=31) where there can be an unauthenticated unique identification record meeting the selection criteria during at least one interval t (this excludes the bit pattern with all zeroes). Bit pattern $B_i$ has pattern $b_{i1} b_{i2} \ldots b_{iN}$. As such the summarization table would provide, for each of the 31 bit patterns, a count $C_i$ of the number of times that the bit pattern was generated by data processing component 230 for the set of unauthenticated unique identification records. The total number of unauthenticated unique identifiers U for all bit patterns $B_i$ is the sum of $C_i$ which follows:

$$U = \Sigma_{i=1}^{M} C_i.$$

Unauthenticated unique user count component 120 also includes modeling component 240 that models parameters $(p_1, p_2, \ldots p_N, \phi, \text{and } \lambda)$ associated with a distribution function for estimating quantity of unique users from the set of unauthenticated unique identifiers associated with the set of unauthenticated unique identification records. While the examples herein use parameters $(p_1, p_2, \ldots p_N, \phi, \text{and } \lambda)$, it is to be appreciated that the model can employ more parameters, less parameters, different parameters, or any suitable parameters. Each unique user can initiate a transaction that causes an unauthenticated unique identification record during each interval. In the model, the probability that an unauthenticated unique identification record meeting the selection criteria for a unique user is generated during each interval $t_m$ is modeled as $p_m$. This implies that the probability that an unauthenticated unique identification record meeting the selection criteria for the unique user is not met during interval $t_m$ is $(1-p_m)$. For the entire time frame, the model purports that the probability, for an unauthenticated unique identifier, of the bit pattern of unauthenticated unique identification records meeting the selection criteria associated with the unique user during the time frame is:

$$(p_1^{v_1} \times (1-p_1)^{1-v_1}) \times (p_2^{v_2} \times (1-p_2)^{1-v_2}) \times \ldots \times (p_N^{v_N} \times (1-p_N)^{1-v_N})$$

where $v_m$ takes a value 1 if and only if an unauthenticated unique identification record meeting the selection criteria for the unique user is generated during interval $t_m$, and $v_m$ takes a value 0 if an unauthenticated unique identification record meeting the selection criteria for the unique user is not generated during interval $t_m$.

In an optional variation of the model, $p_m$ may itself be a function of $v_1, v_2, \ldots, v_{m-1}, v_{m+1}, \ldots, v_N$ and other covariates related to the user or their behavior. That is, the probability of seeing an unauthenticated unique identifier with an unauthenticated unique identification record meeting the selection criteria in interval t, may be modeled based on the unauthenticated unique identifier's generated bit patterns in the past or future. For example, if an unauthenticated unique identification record meeting the selection criteria for a unique user is generated during interval $t_{m-1}$, then one can model the probability of an unauthenticated unique identification record meeting the selection criteria for the unique user being generated in interval t as being slightly larger (or smaller). How much larger or smaller would depend on a new model parameter. For instance, suppose one writes $p_m'$ as the probability of an unauthenticated unique identification record meeting the selection criteria for a unique user being generated in interval $t_m$ conditioned on an unauthenticated unique identification record meeting the selection criteria also being generated for the unique user in interval $t_{m-1}$. Then one can model $p_m'' = \gamma p_m'$ as the probability of an unauthenticated unique identifier meeting the selection criteria for a unique user being generated in interval $t_m$ conditioned on an unauthenticated unique identification record meeting the selection criteria not being generated for the unique user in interval $t_{m-1}$. In this example, $\gamma$ is independent of t and would be an additional parameter to be estimated in the model.

During each interval t in which one or more unauthenticated unique identification records meeting the selection criteria is generated for the unique user, the unique user falls into one of two categories. The first category is a stable group in which the one or more unauthenticated unique identification records are associated with a previous unauthenticated unique identifier acting as a surrogate for the unique user or a new unauthenticated unique identifier acting as a surrogate for the unique user where the unique user did not have a previous unauthenticated unique identifier acting as a surrogate for the unique user. The probability that the unique user falls into the first category is $\phi$. The second category is a churning group in which at least one unauthenticated unique identification record meeting the selection criteria for the unique user is associated with a new unauthenticated unique identifier acting as a surrogate for the unique user that was generated in response to an action by the unique user when the unique user already had a previous unauthenticated unique identifier acting as a surrogate for the unique user. This is conventionally referred to as a churn of the unauthenticated unique identifier. The probability that the unique user falls into the second category is $1-\phi$. The number of churns X can be modeled using a Poisson distribution, a binomial distribution, a negative binomial distribution, a Bernoulli distribution, a geometric distribution, a discrete uniform distribution on a finite support, or any other suitable distribution function with parameter $\lambda$, where $\lambda$ may be multidimensional to represent the parameters of the chosen distribution function. We can assume that the parameter $\lambda$ is consistent across all intervals. It is to be appreciated that the choice of distribution function can have zero probability weight at zero. The parameters $(p_1, p_2, \ldots p_N, \phi, \text{and } \lambda)$ associated with the distribution function are estimated by the model.

In an optional variation of the model, a unique user is categorized across the entire time frame instead of each interval. For example, the first category is a stable group where all unauthenticated unique identification records meeting the selection criteria generated for the unique user for all intervals are associated with a single unauthenticated unique identifier acting as a surrogate for the unique user. The unique user is in the category for the entire time frame. The probability that the unique user falls into the first category is $\phi$. The second category is a churning group where at least one unauthenticated unique identification records meeting the selection criteria for the unique user in any interval is associated with a new unauthenticated unique identifier acting as a surrogate for the unique user that was generated in response to an action by the unique user when the unique user already had a previous unauthenticated unique identifier acting as a surrogate for the unique user. The unique user is in the category for the entire time frame. The probability that the unique user falls into the second category is $1-\phi$. The number of churns X can be modeled using a Poisson distribution, a binomial distribution, a negative binomial distribution, a Bernoulli distribution, a geometric distribution, a discrete uniform distribution on a finite support, or any other suitable distribution function with parameter $\lambda$, where $\lambda$ may be multidimensional to represent the parameters of the chosen distribution function. We can assume that the parameter $\lambda$ is consistent across all intervals and X represents a random variable from the distribution function. It is to be appreciated that the choice of distribution function can have zero probability weight at zero. The parameters $(p_1, p_2, \ldots p_N, \phi, \text{and } \lambda)$ associated with the distribution function are estimated by the model.

More generally, the probability of churn in one interval according to the model can be dependent on the probability of churn in other intervals.

Modeling component 240 employs one or more sets of possible values for the parameters $(p_1, p_2, \ldots p_N, \phi, \text{and } \lambda)$ that represent estimates of the values of the parameters. It is to be appreciated that the sets of possible values for the parameters can be predefined, dynamically determined, and/or user specified. For example, sets of possible values for the parameters can be stored in a library. In another example, sets of possible values for the parameters can be dynamically determined, such as using a random number generator. In a further example, a user can be prompted to input sets of possible values for the parameters. It is to be appreciated that any suitable mechanism can be employed for selecting, receiving, or generating sets of possible values for the parameters. Each set of possible values for the parameters represents starting values for the parameters and are fine-tuned by modeling component 240 using an optimization algorithm to become estimates of values of the parameters ($p_1, p_2, \ldots p_N, \phi,$ and $\lambda$) more representative of the set of unauthenticated unique identification records meeting the selection criteria.

For each set of possible starting values, modeling component 240 employs an optimization algorithm using an optimization criteria to fine-tune the starting values until they become estimates of values of the parameters ($p_1, p_2, \ldots p_N$, $\phi$, and $\lambda$) In a non-limiting example, the optimization criteria can include a maximum likelihood criteria, a least squares criteria, a mean squared error criteria, a least absolute deviations criteria, an $L^p$ spaces criteria, or any other suitable optimization criteria. It is to be appreciated that with some optimization algorithms some sets of staring values may not converge in view of the optimization criteria. For those sets of values that do converge, modeling component 240 will compare, using an agreement criteria, the respective estimated values for the parameters produced by the optimization algorithm from each set of starting values to determine if the respective estimated values for the parameters agree. The agreement criteria can be predefined, dynamically determined, and/or user specified. The agreement criteria is indicative of how closely the respective estimated values for the parameters are to each other. In a non-limiting example, the agreement criteria can include standard deviation, mean squared deviation, variance, or any other suitable criteria for measuring the agreement of the respective estimated values for the parameters. If modeling component 240 determines that the respective estimated values for the parameters do not agree, modeling component 240 can provide an indication that the model did not converge and indicate that a reasonable estimate for the ratio of unauthenticated unique identifiers to unique users did not result from the model.

If modeling component 240 determines that the respective estimated values for the parameters do agree, modeling component 240 can select estimated values for the parameters ($p_1, p_2, \ldots p_N$, $\phi$, and $\lambda$) from the respective estimated values for the parameters that do agree, and indicate the selected estimated values for parameters as the resulting parameters values from the model. In a non-limiting example, modeling component 240 can select the estimated values for the parameters that have the best fit according to the optimization criteria from the respective estimated values for the parameters that do agree. For example, if maximum likelihood is the optimization criteria, then modeling component 240 can select the estimated values for the parameters that have the highest likelihood value according to the optimization algorithm. The selected estimated values for the parameters will imply the ratio r of unauthenticated unique identifiers to unique users. For example, a ratio r=3 would indicate that there are three unique identifiers for every one unique user. Suppose M is the total number of unauthenticated unique identifiers associated with unauthenticated unique identification records that met the selection criteria. Modeling component 240 can estimate the number of unique users Q associated with the set of unauthenticated unique identification records by rescaling the total number of unauthenticated unique identifiers U by ratio r, which follows:

$$Q=U/r$$

For example, if U=9 million and r=3, then the estimated number of unique users Q can be determined by 9 million divided by 3 which equals 3 million estimated unique users.

In order to determine ratio r, modeling component 240 determines the possible churn patterns $S_{ij}$ for each possible bit pattern $B_i$ that can occur, where i=1 to M, and where j=1 to $D_i$, where $D_i$ is the number of possible churn patterns for bit pattern $B_i$. Churn pattern S has a length of N (e.g. $s_1 s_2 \ldots s_N$) where each bit $s_m$ represents an interval $t_m$, a value of 1 for the bit $s_m$ indicates a churn during interval $t_m$, and a value of 0 for the bit $s_m$ indicates no churn during interval $t_m$. As such, $S_{ij}$ has a pattern of $s_{ij1} s_{ij2} \ldots s_{ijN}$. A churn pattern is a pattern representing a possible churn scenario that a unique user could have created given the bit pattern. For example, three intervals $t_1, t_2, t_3$ results in 7 possible bit patterns 001, 010, 011, 100, 101, 110, 111. In a non-limiting example for bit pattern 011, there are four possible churn patterns: no churns with churn pattern 000, churns in interval $t_2$ but not interval $t_3$ with churn pattern 010, churns in interval $t_3$ but not interval $t_2$ with churn pattern 001, and churns in intervals $t_2$ and $t_3$ with churn pattern 011. Since there were no unauthenticated unique identification records that met the selection criteria during interval $t_i$, no churns are considered in that interval. In another non-limiting example for bit pattern 101, there are four possible churn patterns: no churns with churn pattern 000, churns in interval $t_i$ but not interval $t_3$ with churn pattern 100, churns in interval $t_3$ but not interval $t_i$ with churn pattern 001, and churns in intervals $t_2$ and $t_3$ with churn pattern 101.

Modeling component 240 then determines an expected number of unauthenticated unique identifiers for each churn pattern $S_{ij}$ and bit pattern $B_i$ combination given a single churn in each interval with churn(s) and an expected number of unauthenticated unique identifiers for each churn pattern $S_{ij}$ and bit pattern $B_i$ combination given more than one churn in each interval with churn(s). Let $F_{ij}$ be the expected number of unauthenticated unique identifiers for churn pattern $S_{ij}$ and bit pattern $B_i$ combination given a single churn in each interval with churn(s), and $G_{ij}$ be the number of bits in churn pattern $S_{ij}$ that have a value of one. Modeling component 240 determines $F_{ij}$ and $G_{ij}$. Continuing with the non-limiting example above, a bit pattern of 111 and a churn pattern of 010 would result in two unauthenticated unique identifiers respectively having patterns 110 and 011 since there is only a churn in interval two, and in zero or more additional unauthenticated unique identifiers having a pattern of 010. The 010 comes from the fact that there is the possibility of being two or more churns in the second interval. Modeling component 240 will determine unauthenticated unique identifiers for each churn pattern $S_{ij}$ and bit pattern $B_i$ combination. In another non-limiting example, a bit pattern of 011101 and a churn pattern of 011001 would result in one unauthenticated unique identifier having 010000 (churn in interval 2), one unauthenticated unique identifier having a pattern of 011000 (churn in interval 3), one unauthenticated unique identifier having a pattern of 001101 (no churn in intervals 4 and 5), one unauthenticated unique identifier having a pattern of 000001 (churn in interval 6), and in zero or more additional unauthenticated unique identifiers having a pattern of 010000 (more than one churn in interval 2), in zero or more additional unauthenticated unique identifiers having a pattern of 001000 (more than one churn in interval 3) and in zero or more additional unauthenticated unique identifiers having a pattern of 000001 (more than one churn in interval 6).

Figure 5:
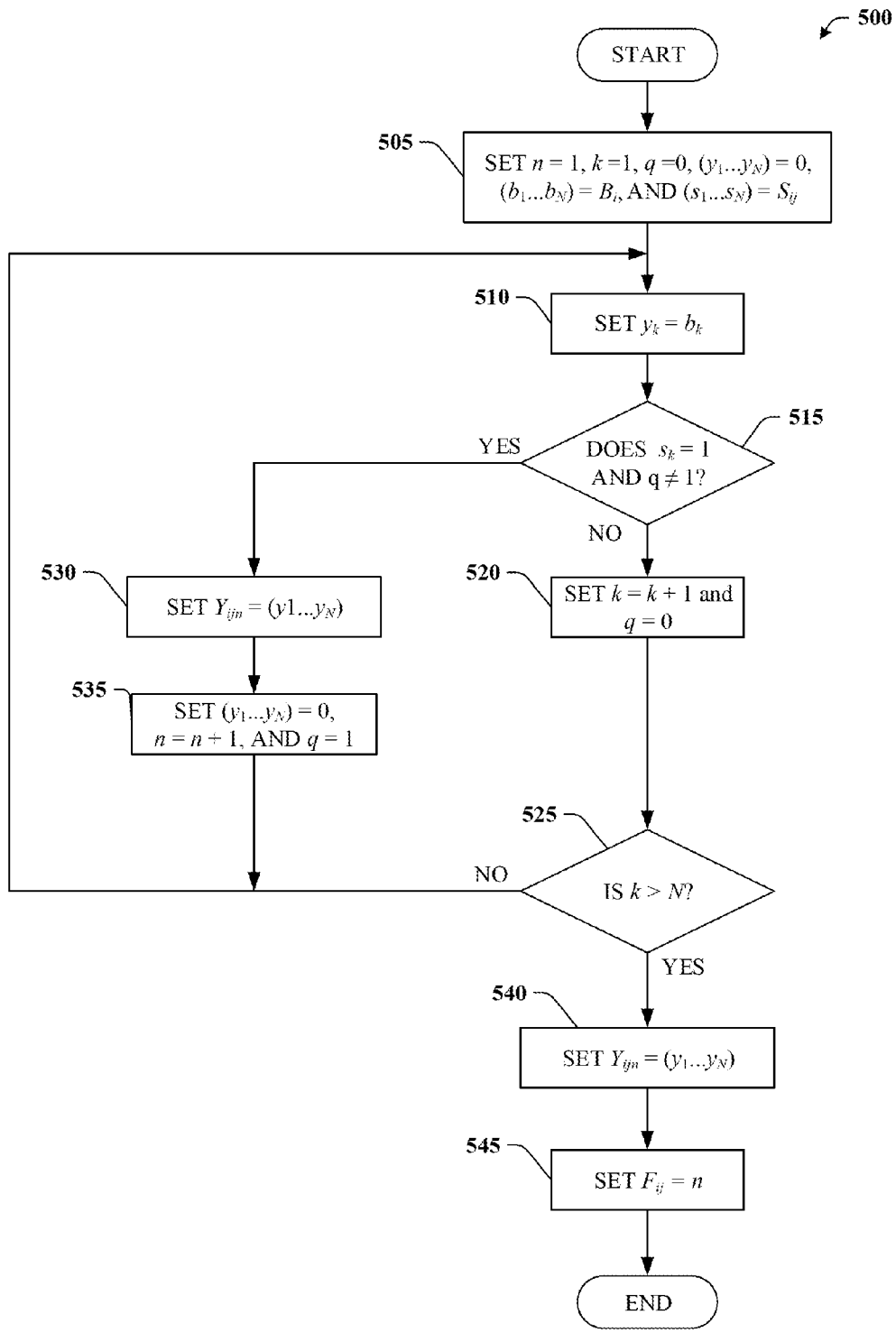
FIG. 5 illustrates an exemplary non-limiting flow diagram for determining bit patterns for unauthenticated unique identifiers for a combination of churn pattern and bit pattern given the number of churns in intervals where there is churn(s) is one in accordance with an implementation of this disclosure.

Modeling component 240 can determine the bit patterns for the unauthenticated unique identifiers for churn pattern $S_{ij}$ and bit pattern $B_i$ combination given a single churn in each interval with churn(s), for example, using the method disclosed in FIG. 5. There is one churn in each interval in which a bit for churn pattern $S_{ij}$ has a value of one, therefore, the value of $F_{ij}$ will be one more than the number of bits in $S_{ij}$ that have a value of one. For example, a churn pattern of 0110 would have a value for $F_{ij}$ of 3, and a churn pattern of 01110011 would have a value for $F_{ij}$ of 6.

Modeling component 240 can determine the bit patterns for the unauthenticated unique identifiers for churn pattern $S_{ij}$ and bit pattern $B_i$ combination given more than one churn in each interval with churn(s), by creating additional bit patterns for each bit $s_m$ in the churn pattern $S_{ij}$ that has a value of one. By keeping a bit $s_m$ in the churn pattern $S_{ij}$ that has a value of one and making the other bits zero, modeling component 240 can create a bit pattern for unauthenticated unique identifiers associated with bit $s_m$. Modeling component 240 does this for each bit $s_m$ in the churn pattern $S_{ij}$ that has a value of one. This results in the value of $G_{ij}$ being the number of bits $s_m$ in the churn pattern $S_{ij}$ that have a value of one. For example, the churn pattern 1011 would have a value for $G_{ij}$ of 3, for the unauthenticated unique identifiers having bit patterns 1000, 0010, and 0001 when the churns are greater than one in the intervals with churns. In another example, the churn pattern 0110101 would have a value for $G_{ij}$ of 4, for the unauthenticated unique identifiers having bit patterns 0100000, 0010000, 0000100, and 0000001 when the churns are greater than one in the intervals with churns.

Modeling component 240 then determines the probability $c_{ij}$ of each churn pattern $S_{ij}$ (e.g. $s_{ij1} s_{ij2} \ldots s_{ijN}$) for each bit pattern $B_i$ (e.g. $b_{i1} b_{i2} \ldots b_{iN}$). The probability $c_{ij}$ is given by:

$$c_{ij} = P(B_i) * P(S_{ij}|B_i), \text{ where}$$

$$P(B_i) = ((1-p_1)^{1-b_{i1}} * (p_1)^{b_{i1}}) * ((1-p_2)^{1-b_{i2}} * (p_2)^{b_{i2}}) * \ldots * ((1-p_N)^{1-b_{iN}} * (p_N)^{b_{iN}}), \text{ and}$$

$$P(S_{ij}|B_{ij}) = ((\phi)^{1-s_{ij1}} (1-\phi)^{s_{ij1}})^{b_{i1}} * ((\phi)^{1-s_{ij2}} (1-\phi)^{s_{ij2}})^{b_{i2}} * \ldots * ((\phi)^{1-s_{ijN}} (1-\phi)^{s_{ijN}})^{b_{iN}}.$$

Modeling component 240 normalizes each $c_{ij}$ by dividing $c_{ij}$ by the sum of all $c_{ij}$ to produce normalized probability $c'_{ij}$, which follows:

$$c'_{ij} = \frac{c_{ij}}{\sum_{i=1}^{M} \sum_{j=1}^{D_i} c_{ij}}.$$

Continuing with the example above for a bit pattern of 111 and a churn pattern of 010, the probability $c_{ij}$ of a combination of bit pattern of 111 and a churn pattern of 010 is:

$$p_1 p_2 p_3 \phi (1-\phi) \phi.$$

Modeling component 240 also determines the expected number of unauthenticated unique identifiers $E_{B_i S_{ij}}$ for each combination of bit pattern $B_i$ and churn pattern $S_{ij}$. To do this we need to determine the expected number of unauthenticated unique identifiers conditioned on the number of churns in each interval in each interval with churn(s) equaling one, and expected number of unauthenticated unique identifiers conditioned on the number of churns in each interval in each interval with churn(s) being greater than one. The expected number of unauthenticated unique identifiers conditioned on the number of churns in each interval in each interval with churn(s) equaling one, would be $F_{ij}$ since there would be one more unauthenticated unique identifier than the number of bits $s_m$ in the churn pattern $S_{ij}$ having a value of one, i.e., where there is a churn in that interval.

Continuing with the example above of a bit pattern of 111 and a churn pattern of 010, $F_{ij}=2$, one unauthenticated unique identifier for each bit pattern 110 and 011.

The expected number of unauthenticated unique identifiers conditioned on the number of churns in each interval with churn(s) being greater than one $A_{ij}$, would be $G_{ij}$, which is the number of bits $s_m$ in churn pattern $S_{ij}$ having a value of one, multiplied by the sum of the expected number $E_{B_i S_{ij}}(X|X>0, \lambda)$ of unauthenticated unique identifiers conditioned on the number of churns being greater than one in an interval with churns, being determined from the distribution function, and minus one, and given that we are assuming that the churn rate is the same in each interval, The minus one is based on one churn already being accounted for with $F_{ij}$. Determination of $A_{ij}$ follows:

$$A_{ij} = G_{ij} * (E(X|X>0, \lambda) - 1).$$

Modeling component 240 determines $A_{ij}$.

Therefore, the expected number of unauthenticated unique identifiers $E_{B_i S_{ij}}$ for each combination of bit pattern $B_i$ and churn pattern $S_{ij}$ would follow:

$$E_{B_i S_{ij}} = F_{ij} + A_{ij}.$$

The model gives the total expected number of unauthenticated unique identifiers T for all combinations of bit pattern $B_i$ and churn pattern $S_{ij}$ as the sum of products of each expected number of unauthenticated unique identifiers $E_{B_i S_{ij}}$ and its corresponding probability $c_{ij}$ which follows:

$$T = \sum_{i=1}^{M} \sum_{j=1}^{D_i} E_{B_i S_{ij}} * c'_{ij}$$

Modeling component 240 determines T.

Given that modeling component 240 has determined the possible churn patterns $S_{ij}$ for each possible bit pattern $B_i$ that can occur, modeling component 240 has determined the total number V of churn patterns $S_{ij}$ for all bit patterns $B_i$, which follows:

$$V = \sum_{i=1}^{M} D_i.$$

Modeling component 240 can determine ratio r of unauthenticated unique identifiers to users as the total number of expected unauthenticated unique identifiers T divided by the total number V of churn patterns $S_{ij}$ for all bit patterns $B_i$, which follows:

$$r = T/V$$

As discussed above, modeling component 240 can estimate the number of unique users Q associated with the set of unauthenticated unique identification records by resealing the total number of unauthenticated unique identifiers U by ratio r, which follows:

$$Q = U/r.$$

Figure 3A:
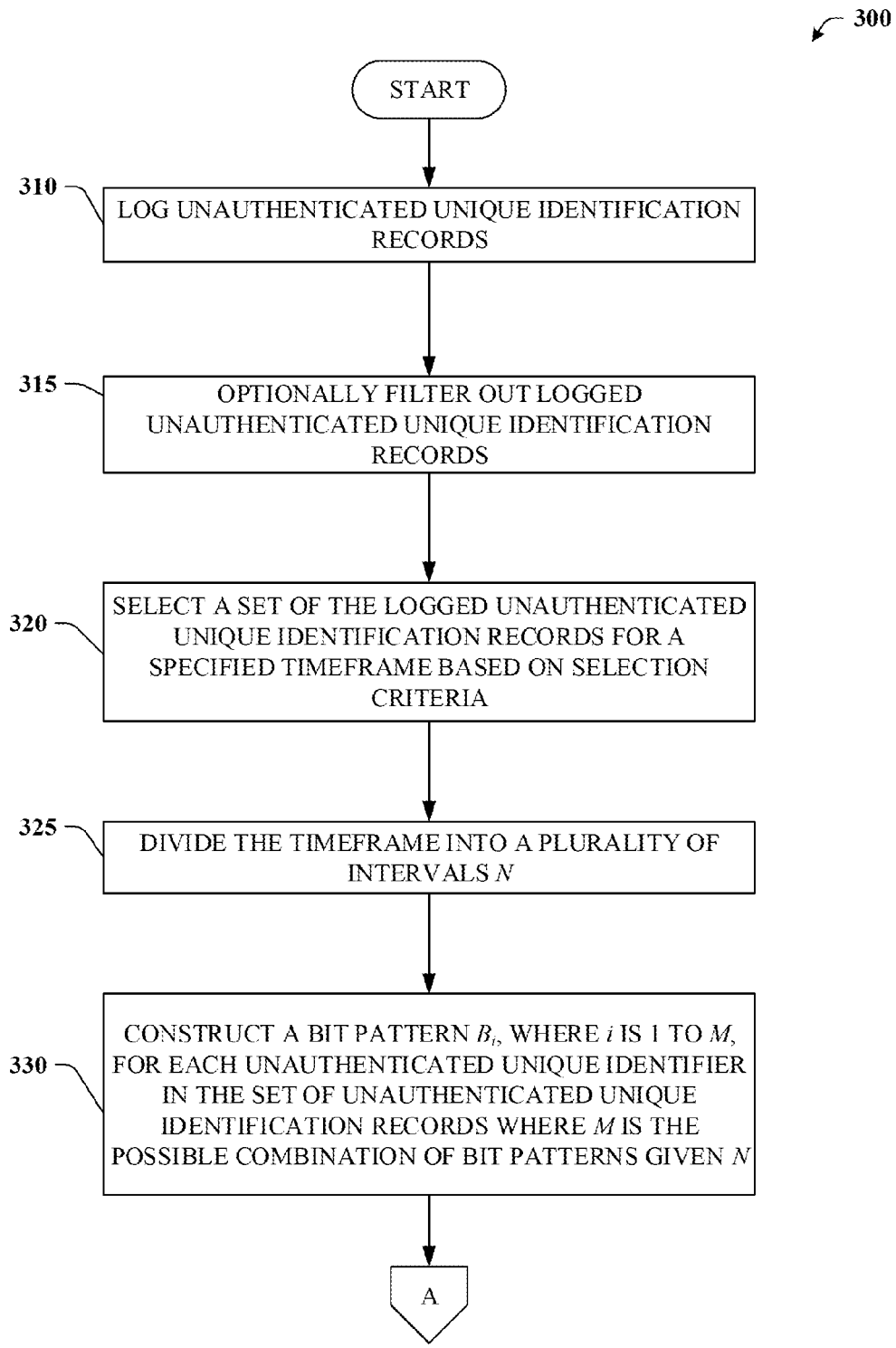
FIGS. 3A and 3B illustrate an exemplary non-limiting flow diagram for determining number of unique users associated with unauthenticated unique identifiers in a set of unauthenticated unique identification records in accordance with an implementation of this disclosure.
Figure 3B:
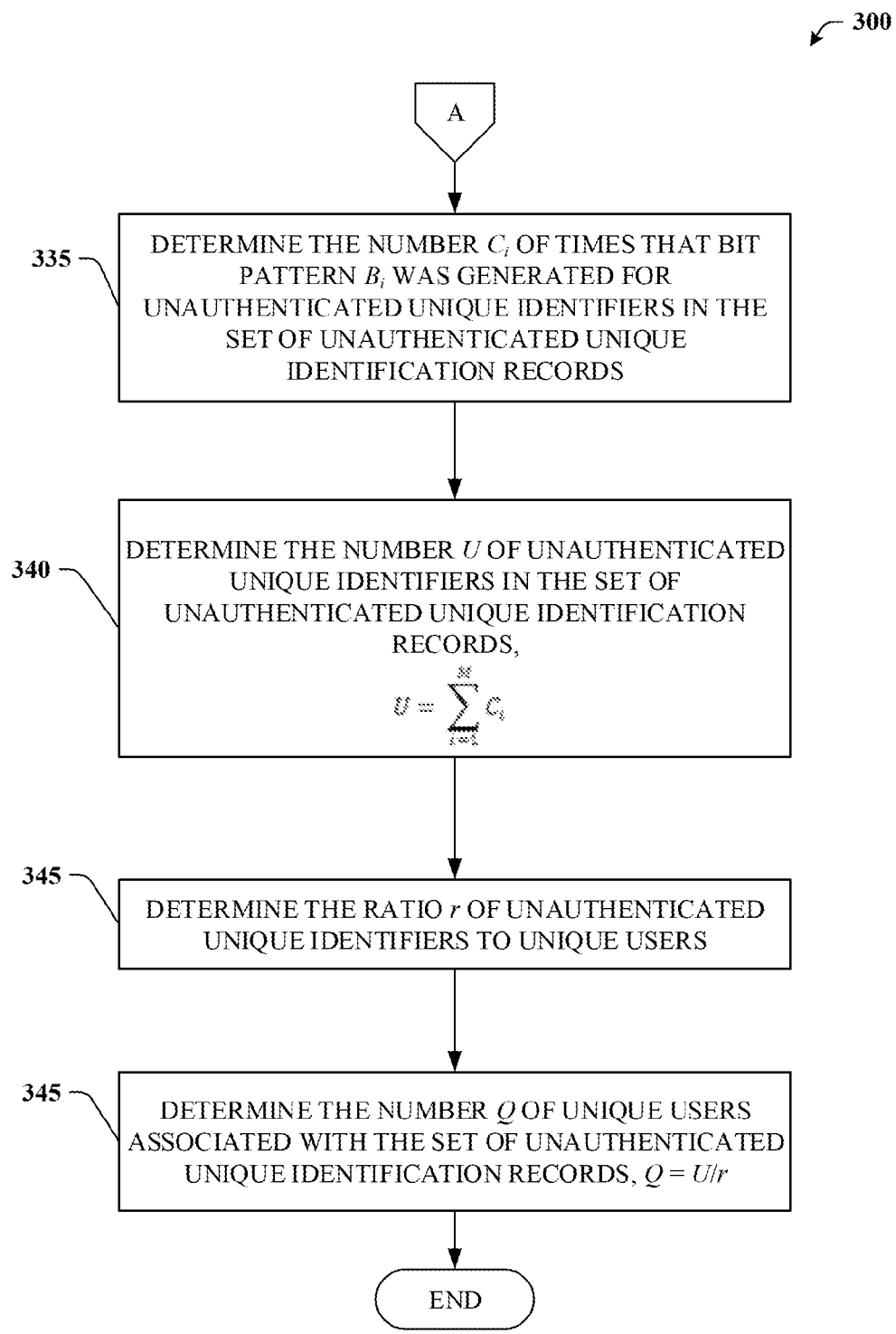
Figure 4A:
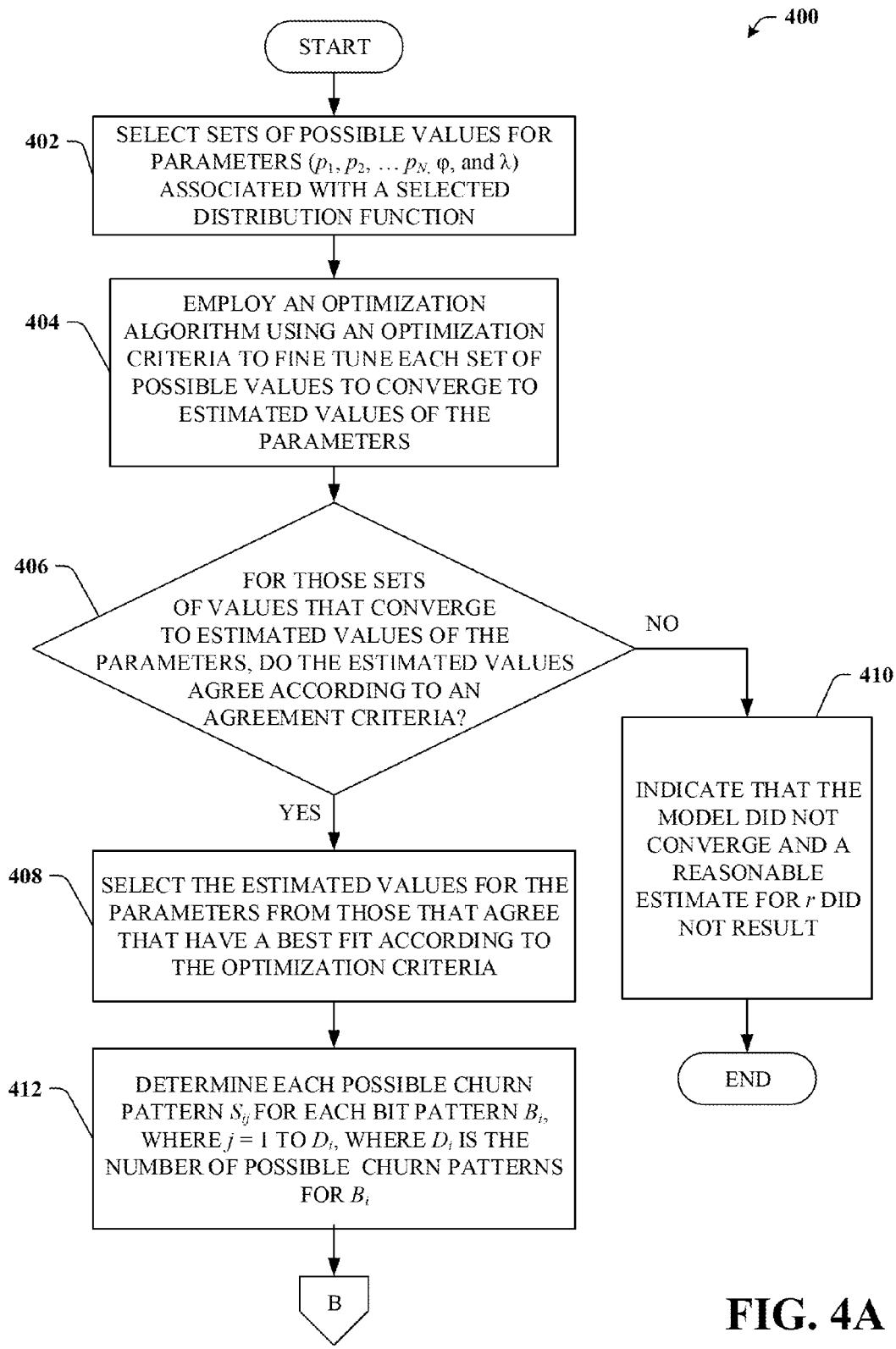
FIGS. 4A, 4B, 4C, and 4D illustrate an exemplary non-limiting flow diagram for determining ratio of unauthenticated unique identifiers to unique users in accordance with an implementation of this disclosure.
Figure 4B:
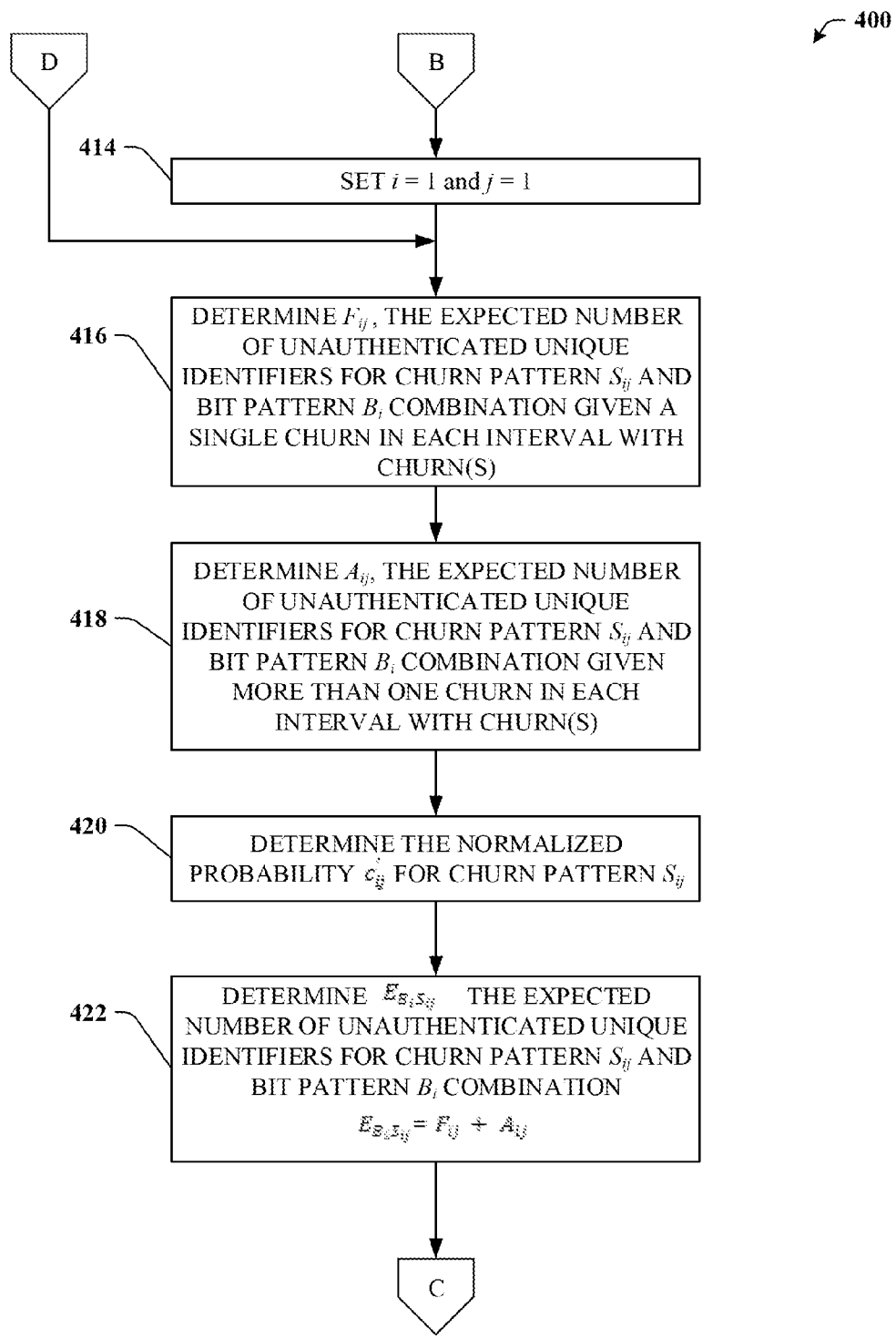
Figure 4C:
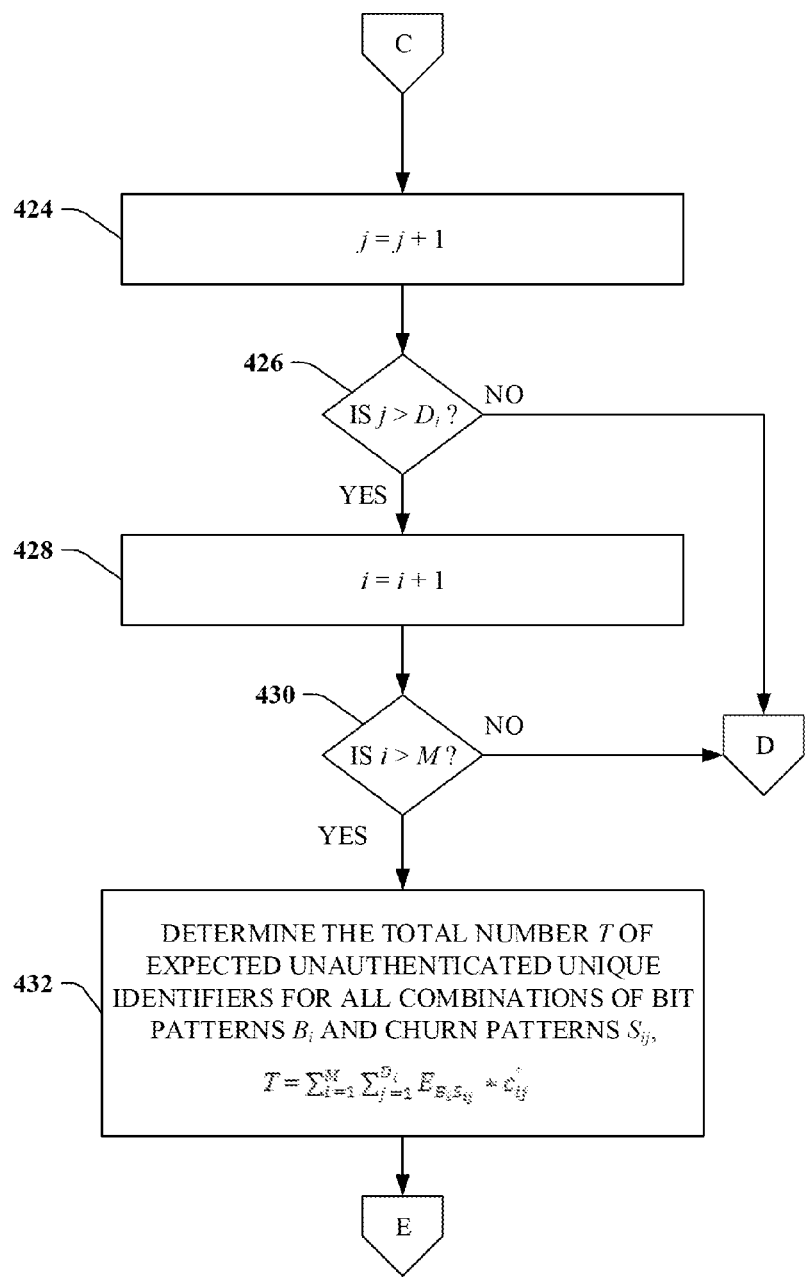
Figure 4D:
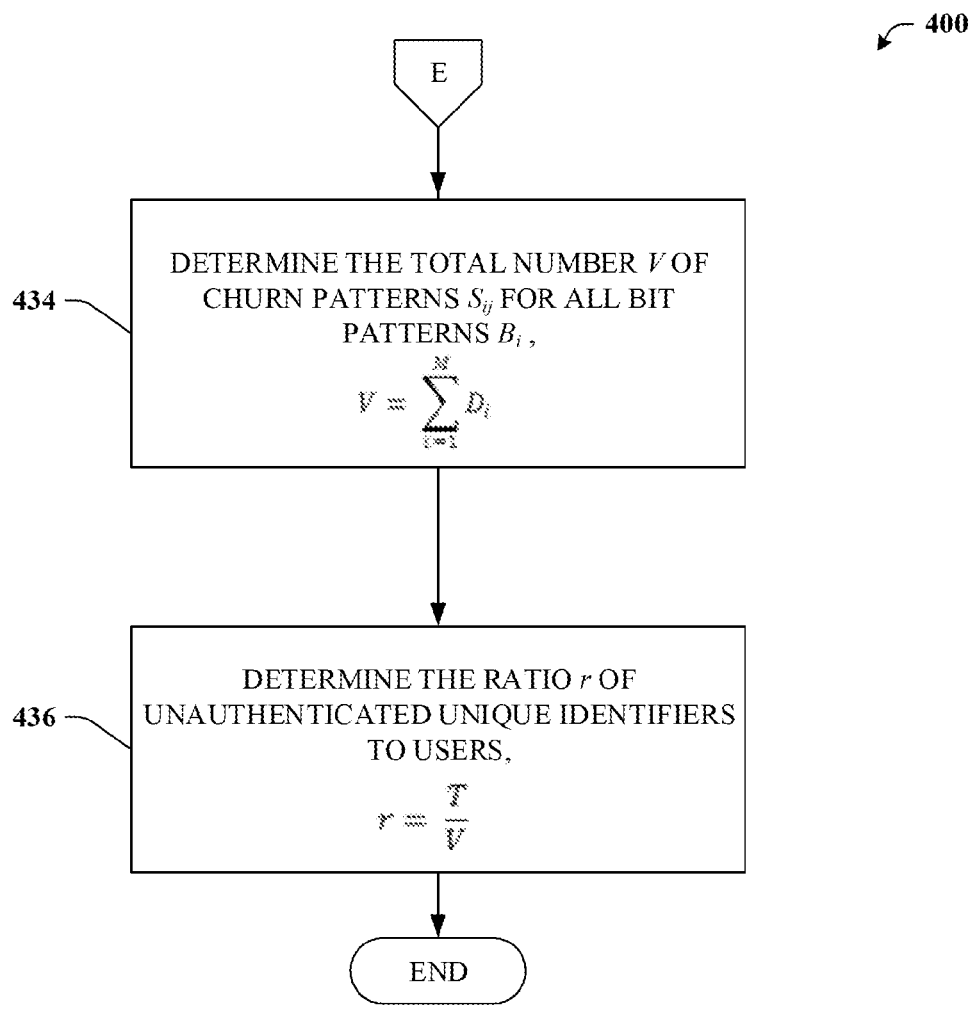

FIGS. 3-5 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects.

Additionally, it is to be further appreciated that the methodologies disclosed hereinafter and throughout this disclosure are capable of being stored on an article of manufacture to facilitate transporting and transferring such methodologies to computers.

Referring to FIG. 3, an exemplary method 300 for determining number of unique users (or visitors) associated with the unauthenticated unique identifiers in a set of unauthenticated unique identification records is depicted. At reference numeral 310, unauthenticated unique identification records are logged (e.g., by an unauthenticated unique identifier logging component 210, or unauthenticated unique user count component 120). At reference numeral 315, optionally, logged unauthenticated unique identification records are filtered out based upon filtering criteria (e.g., by an unauthenticated unique identifier logging component 210, or unauthenticated unique user count component 120). At reference numeral 320, a set of the logged unauthenticated unique identification records is selected for a specified time frame based upon selection criteria (e.g., by a data selection component 220, or unauthenticated unique user count component 120). At reference numeral 325, the time frame is divided into a plurality of intervals N (e.g., by a data processing component 230, or unauthenticated unique user count component 120). At reference numeral 330, a bit pattern $B_i$ is constructed for each unauthenticated unique identifier in the set of unauthenticated unique identification records, where i is 1 to M and M is the possible combination of bit patterns given N (e.g., by a data processing component 230, or unauthenticated unique user count component 120). At reference numeral 335, number $C_i$ of times that bit pattern $B_i$ was generated for unauthenticated unique identifiers in the set of unauthenticated unique identification records is determined (e.g., by a data processing component 230, or unauthenticated unique user count component 120). At reference numeral 340, number U of unauthenticated unique identifiers in the set of unauthenticated unique identification records is determined (e.g., by a data processing component 230, or unauthenticated unique user count component 120). At reference numeral 345, ratio r of unauthenticated unique identifiers to unique users is determined (e.g., by a modeling component 240, or unauthenticated unique user count component 120). At reference numeral 350, the number Q of unique users associated with the set of unauthenticated unique identification records, Q=U/r, is determined (e.g., by a modeling component 240, or unauthenticated unique user count component 120).

Referring to FIG. 4, an exemplary method 400 for determining the ratio r of unauthenticated unique identifiers to unique users is depicted, such as for example, related to element 345 of FIG. 3. At reference numeral 402, sets of possible values are selected for parameters ($p_1$, $p_2$, ... $p_N$, $\phi$, and $\lambda$) associated with a selected distribution function (e.g., by a modeling component 240, or unauthenticated unique user count component 120). At reference numeral 404, an optimization algorithm is employed using an optimization criteria to fine tune each set of possible values to converge to estimated values of the parameters (e.g., by a modeling component 240, or unauthenticated unique user count component 120). At reference numeral 406, a determination is made whether for those sets of values that converge to estimated values of the parameters, do the estimated values agree according to an agreement criteria. (e.g., by a modeling component 240, or unauthenticated unique user count component 120). If the determination at 406 is "NO" meaning that a determination has been made that the estimated values do not agree according to an agreement criteria, the method proceeds to element 410. If the determination at 406 is "YES" meaning that a determination has been made that the estimated values do agree according to an agreement criteria, the method proceeds to element 408. At reference numeral 410, an indication is provided that the model did not converge and a reasonable estimate for r did not result (e.g., by a modeling component 240, or unauthenticated unique user count component 120). At reference numeral 408, of the sets of estimated values that converged, the set of estimated values for the parameters that have a best fit according to the optimization criteria are selected (e.g., by a modeling component 240, or unauthenticated unique user count component 120). At reference numeral 412, each possible churn $S_{ij}$ pattern for each bit pattern $B_i$ is determined, where j=1 to $D_i$, where $D_i$ is the number of possible churn patterns for $B_i$ (e.g., by a modeling component 240, or unauthenticated unique user count component 120). At reference numeral 414, variables i and j are set to i=1 and j=1, where i and j are integers (e.g., by a modeling component 240, or unauthenticated unique user count component 120). At reference numeral 416, $F_{ij}$, the expected number of unauthenticated unique identifiers for churn pattern $S_{ij}$ and bit pattern $B_i$ combination given a single churn in each interval with churn(s), is determined (e.g., by a modeling component 240, or unauthenticated unique user count component 120). At reference numeral 418, $A_{ij}$, expected number of unauthenticated unique identifiers conditioned on the number of churns in each interval with churn(s) being greater than one, is determined (e.g., by a modeling component 240, or unauthenticated unique user count component 120). At reference numeral 420, the normalized probability for churn pattern $S_{ij}$ is determined (e.g., by a modeling component 240, or unauthenticated unique user count component 120). At reference numeral 422, the expected number of unauthenticated unique identifiers $E_{B_i S_{ij}}$ for churn pattern $S_{ij}$ and bit pattern $B_i$ combination is determined, (e.g., by a modeling component 240, or unauthenticated unique user count component 120). At reference numeral 424, variable j is incremented by one, (e.g., by a modeling component 240, or unauthenticated unique user count component 120). At reference numeral 426, a determination is made whether j is greater than $D_i$. (e.g., by a modeling component 240, or unauthenticated unique user count component 120). If the determination at 426 is "NO" meaning that j is not greater than $D_1$, the method proceeds to element 416. If the determination at 426 is "YES" meaning that j is greater than $D_i$, the method proceeds to element 428. At reference numeral 428, variable i is incremented by one, (e.g., by a modeling component 240, or unauthenticated unique user count component 120). At reference numeral 430, a determination is made whether i is greater than M. (e.g., by a modeling component 240, or unauthenticated unique user count component 120). If the determination at 430 is "NO" meaning that i is not greater than M, the method proceeds to element 416. If the determination at 430 is "YES" meaning that i is greater than M, the method proceeds to element 432. At reference numeral 432, the total number T of expected unauthenticated unique identifiers for all combinations of bit patterns $B_i$ and churn patterns $S_{ij}$ is determined, (e.g., by a modeling component 240, or unauthenticated unique user count component 120). At reference numeral 434, the total number V of churn patterns $S_{ij}$ for all bit patterns $B_i$ is determined, (e.g., by a modeling component 240, or unauthenticated unique user count component 120). At reference numeral 436, the ratio r of unauthenticated unique identifiers to users is determined, r=T/V, (e.g., by a modeling component 240, or unauthenticated unique user count component 120).

Referring to FIG. 5, an exemplary method 500 for determining the bit patterns for additional unauthenticated unique identifiers for churn pattern $S_{ij}$ given one churn in each interval where $S_{ij}$ has a bit value $s_m$ equal to one, where $F_{ij}$ is the number of additional unauthenticated unique identifiers for churn pattern $S_{ij}$ given one churn in each interval where $S_{ij}$ has a bit value $s_m$ equal to one, such as for example related to element 416 of FIG. 4. At reference numeral 505, integer variables n, k, and q are set to n=1, k=1, q=0, and $(y_1 \ldots y_N)$=0, $(b_1 \ldots b_N)$=$B_i$, and $(s_i \ldots s_N)$=$S_{ij}$, where $(y_1 \ldots y_N)$ represents the bits for additional unauthenticated unique identifier $Y_{ijn}$ (e.g., by a modeling component 240, or unauthenticated unique user count component 120). At reference numeral 510, bit $y_k$ is set equal to $b_k$ (e.g., by a modeling component 240, or unauthenticated unique user count component 120). At reference numeral 515, a determination is made whether $s_k$ is equal to one and q is not equal to one? (e.g., by a modeling component 240, or unauthenticated unique user count component 120). If the determination at 515 is "NO" meaning that $s_k$ is not equal to one or q is equal to one, the method proceeds to element 520. If the determination at 514 is "YES" meaning that $s_k$ is equal to one and q is not equal to one, the method proceeds to element 535. At reference numeral 520, k is incremented by one and q is set equal to zero (e.g., by a modeling component 240, or unauthenticated unique user count component 120). At reference numeral 525, q is set equal to zero (e.g., by a modeling component 240, or unauthenticated unique user count component 120). At reference numeral 525, a determination is made whether k is greater than N? (e.g., by a modeling component 240, or unauthenticated unique user count component 120). If the determination at 525 is "NO" meaning that k is not greater than N, the method proceeds to element 510. If the determination at 525 is "YES" meaning that k is greater than N, the method proceeds to element 540. At reference numeral 540, $Y_{ijn}$ is set equal to $(y_1 \ldots y_N)$ (e.g., by a modeling component 240, or unauthenticated unique user count component 120). At reference numeral 545, $F_{ij}$ is set equal to n (e.g., by a modeling component 240, or unauthenticated unique user count component 120). At reference numeral 530, $Y_{ijn}$ is set equal to $(y_1 \ldots y_N)$ (e.g., by a modeling component 240, or unauthenticated unique user count component 120). At reference numeral 540, n is incremented by one, $(y_1 \ldots y_N)$ is set equal to zero, and q is set equal to one, and the method proceeds to element 510 (e.g., by a modeling component 240, or unauthenticated unique user count component 120).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 6:
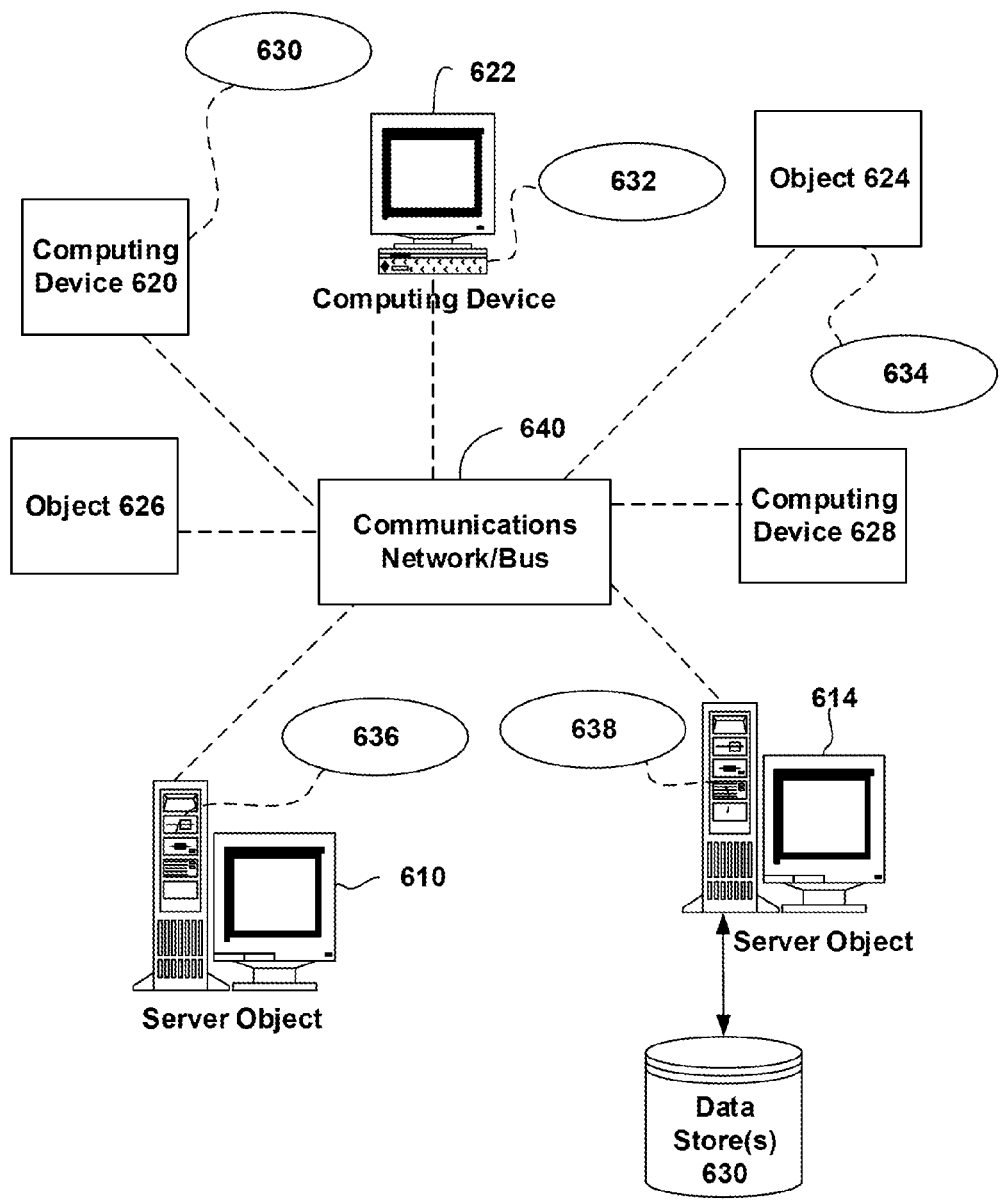
FIG. 6 illustrates a block diagram of an exemplary non-limiting networked environment in which various embodiments can be implemented.

FIG. 6 provides a schematic diagram of an exemplary networked or distributed computing environment. The distributed computing environment comprises computing objects 610, 612, etc. and computing objects or devices 620, 622, 624, 626, 628, etc., which may include programs, methods, data stores, programmable logic, etc., as represented by applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, tablets, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, network 640 may comprise other computing objects and computing devices that provide services to the system of FIG. 6, and/or may represent multiple interconnected networks, which are not shown. Each computing object 610, 612, etc. or computing objects or devices 620, 622, 624, 626, 628, etc. can also contain an application, such as applications 630, 632, 634, 636, 638, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc. provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 640 is the Internet, for example, the computing objects 610, 612, etc. can be Web servers, file servers, media servers, etc. with which the client computing objects or devices 620, 622, 624, 626, 628, etc. communicate via any of a number of known protocols, such as the hypertext transfer protocol (HTTP). Objects 610, 612, etc. may also serve as client computing objects or devices 620, 622, 624, 626, 628, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 7 is but one example of a computing device that can be employed with implementing one or more of the systems or methods shown and described in connection with FIGS. 1-13. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. Neither is the computing environment 700 be interpreted as having any dependency or requirement relating to any one or combination of components illustrated in the exemplary operating environment 700.

With reference to FIG. 7, an exemplary computing device for implementing one or more embodiments in the form of a computer 710 is depicted. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 710. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
accessing, by a device including a processor, a plurality of unauthenticated unique identification records associated with transactions between at least one client device and at least one server device during a specified time frame, wherein respective unauthenticated unique identification records are associated with respective unauthenticated unique identifiers of a plurality of unauthenticated unique identifiers;
selecting, by the device, a subset of the plurality of unauthenticated unique identification records that meet a selection criteria;
segmenting, by the device, the time frame into a plurality of disjoint time intervals;
determining, by the device, possible combinations of bit patterns representing the respective unauthenticated unique identifiers, wherein a length of the bit patterns equals a quantity of the time intervals and each bit of a bit pattern indicates whether a corresponding unauthenticated unique identifier has an associated unauthenticated unique identification record that meets the selection criteria for a time interval associated with the bit;
determining, by the device, a total quantity of possible churn patterns for the bit patterns;
determining, by the device, a total quantity of expected unauthenticated unique identifiers for all combinations of the bit patterns and the churn patterns; and
determining, by the device, a ratio of unauthenticated unique identifiers to unique users based upon the total quantity of expected unauthenticated unique identifiers and the total quantity of the churn patterns.

2. The method of claim 1, further comprising employing, by the device, an optimization algorithm for estimating respective best fit values for a set of parameters of a distribution function according to an optimization criteria, the set of parameters comprising respective capture probabilities for the time intervals indicating probability of an unauthenticated unique identifier having an associated unauthenticated unique identification record that meets the selection criteria during the time interval, a churn probability indicating the probability that the unauthenticated unique identifier is churned in the time intervals, and a rate of churn.

3. The method of claim 2, wherein the determining the total quantity of expected unauthenticated unique identifiers comprises:
determining respective probabilities of the churn patterns using the best fit set of estimated parameters;
determining respective first quantities of unauthenticated unique identifiers for each churn pattern and bit pattern combination given a rate of churns equaling one; and
determining respective second quantities of unauthenticated unique identifiers for each churn pattern and bit pattern combination pattern given a rate of churns greater than one.

4. The method of claim 3, wherein the determining the second quantity comprises determining the second quantity according to the distribution function.

5. The method of claim 2, further comprising proposing, by the device, one or more sets of starting values for the parameters.

6. The method of claim 5, further comprising determining, by the device, respective sets of estimated values for the parameters from the sets of starting values using the optimization algorithm.

7. The method of claim 6, further comprising selecting, by the device, the best fit set of estimated values from the sets of estimated values according to the optimization criteria.

8. The method of claim 1, wherein the optimization criteria is one of a maximum likelihood criteria, a least squares criteria, a mean squared error criteria, a least absolute deviations criteria, or an $L^p$ spaces criteria.

9. The method of claim 1, wherein the distribution function is one of a Poisson distribution, a binomial distribution, a negative binomial distribution, a Bernoulli distribution, a geometric distribution, or a discrete uniform distribution.

10. The method of claim 1, further comprising:
determining, by the device, a quantity of the unauthenticated unique identifiers associated with the subset of unauthenticated unique identification records; and
determining, by the device, a number of unique users associated with the subset based upon the quantity of the unauthenticated unique identifiers and the ratio.

11. A non-transitory computer-readable medium having instructions stored thereon that, in response to execution, cause a system including a processor to perform operations comprising:
accessing a plurality of unauthenticated unique identification records associated with transactions between at least one client device and at least one server device during a specified time frame, wherein respective unauthenticated unique identification records are associated with respective unauthenticated unique identifiers of a plurality of unauthenticated unique identifiers;
selecting a subset of the plurality of unauthenticated unique identification records that meet a selection criteria;
segmenting the time frame into a plurality of disjoint time intervals;
determining possible combinations of bit patterns representing the respective unauthenticated unique identifiers, wherein a length of the bit patterns equals a quantity of the time intervals and each bit of a bit pattern indicates whether a corresponding unauthenticated unique identifier has an associated unauthenticated unique identification record that meets the selection criteria for a time interval associated with the bit;
determining a total quantity of possible churn patterns for the bit patterns;
determining a total quantity of expected unauthenticated unique identifiers for all combinations of the bit patterns and the churn patterns; and
determining a ratio of unauthenticated unique identifiers to unique users based upon the total quantity of expected unauthenticated unique identifiers and the total quantity of the churn patterns.

12. The non-transitory computer-readable medium of claim 11, further comprising employing an optimization algorithm for estimating respective best fit values for a set of parameters of a distribution function according to an optimization criteria, the set of parameters comprising respective capture probabilities for the time intervals indicating probability of an unauthenticated unique identifier having an associated unauthenticated unique identification record that meets the selection criteria during the time interval, a churn probability indicating the probability that the unauthenticated unique identifier is churned in the time intervals, and a rate of churn.

13. The non-transitory computer-readable medium of claim 12, wherein the determining the total quantity of expected unauthenticated unique identifiers comprises:
   determining respective probabilities of the churn patterns using the best fit set of estimated parameters;
   determining respective first quantities of unauthenticated unique identifiers for each churn pattern and bit pattern combination given a rate of churns equaling one; and
   determining respective second quantities of unauthenticated unique identifiers for each churn pattern and bit pattern combination pattern given a rate of churns greater than one.

14. The non-transitory computer-readable medium of claim 13, wherein the determining the second quantity comprises determining the second quantity according to the distribution function.

15. The non-transitory computer-readable medium of claim 12, the operations further comprising proposing one or more sets of starting values for the parameters.

16. The non-transitory computer-readable medium of claim 15, the operations further comprising determining respective sets of estimated values for the parameters from the sets of starting values using the optimization algorithm.

17. The non-transitory computer-readable medium of claim 16, the operations further comprising selecting the best fit set of estimated values from the sets of estimated values according to the optimization criteria.

18. The non-transitory computer-readable medium of claim 11, the operations further comprising:
   determining a quantity of the unauthenticated unique identifiers associated with the subset of unauthenticated unique identification records; and
   determining a number of unique users associated with the subset based upon the quantity of the unauthenticated unique identifiers and the ratio.

19. A system comprising:
   a processor; and
   a memory communicatively coupled to the processor, the memory having stored therein computer-executable instructions, comprising:
      a data processing component configured to:
         access a plurality of unauthenticated unique identification records associated with transactions between at least one client device and at least one server device during a specified time frame, wherein respective unauthenticated unique identification records are associated with respective unauthenticated unique identifiers of a plurality of unauthenticated unique identifiers;
         select a subset of the plurality of unauthenticated unique identification records that meet a selection criteria;
         segment the time frame into a plurality of disjoint time intervals; and
         determine possible combinations of bit patterns representing the respective unauthenticated unique identifiers, wherein a length of the bit patterns equals a quantity of the time intervals and each bit of a bit pattern indicates whether a corresponding unauthenticated unique identifier has an associated unauthenticated unique identification record that meets the selection criteria for a time interval associated with the bit; and
      a modeling component configured to:
         determine a total quantity of possible churn patterns for the bit patterns;
         determine a total quantity of expected unauthenticated unique identifiers for all combinations of the bit patterns and the churn patterns; and
         determine a ratio of unauthenticated unique identifiers to unique users based upon the total quantity of expected unauthenticated unique identifiers and the total quantity of the churn patterns.

20. The system of claim 19, wherein the modeling component is further configured to employ an optimization algorithm for estimating respective best fit values for a set of parameters of a distribution function according to an optimization criteria, the set of parameters comprising respective capture probabilities for the time intervals indicating probability of an unauthenticated unique identifier having an associated unauthenticated unique identification record that meets the selection criteria during the time interval, a churn probability indicating the probability that the unauthenticated unique identifier is churned in the time intervals, and a rate of churn.

21. The system of claim 20, wherein to determine the total quantity of expected unauthenticated unique identifiers comprises:
   determine respective probabilities of the churn patterns using the best fit set of estimated parameters;
   determine respective first quantities of unauthenticated unique identifiers for each churn pattern and bit pattern combination given a rate of churns equaling one; and
   determine respective second quantities of unauthenticated unique identifiers for each churn pattern and bit pattern combination pattern given a rate of churns greater than one.

22. The system of claim 21, wherein to determine the second quantity comprises determine the second quantity according to the distribution function.

23. The system of claim 19, wherein the modeling component is further configured to propose one or more sets of starting values for the parameters.

24. The system of claim 23, wherein the modeling component is further configured to determine respective sets of estimated values for the parameters from the sets of starting values using the optimization algorithm.

25. The system of claim 24, wherein the modeling component is further configured to select the best fit set of estimated values from the sets of estimated values according to the optimization criteria.

26. The system of claim 19, wherein the modeling component is further configured to:
   determine a quantity of the unauthenticated unique identifiers associated with the subset of unauthenticated unique identification records; and
   determine a number of unique users associated with the subset based upon the quantity of the unauthenticated unique identifiers and the ratio.

\* \* \* \* \*